(12) United States Patent
Matsuoka (10) Patent No.: US 11,047,467 B2
(45) Date of Patent: Jun. 29, 2021

(54) TRANSMISSION DEVICE

(71) Applicant: MUSASHI SEIMITSU INDUSTRY CO., LTD., Toyohashi (JP)

(72) Inventor: Shinya Matsuoka, Toyohashi (JP)

(73) Assignee: Musashi Seimitsu Industry Co., Ltd., Aichi (JP)

( * ) Notice: Subject to any disclaimer, the term of this patent is extended or adjusted under 35 U.S.C. 154(b) by 0 days.

(21) Appl. No.: 16/483,573

(22) PCT Filed: Feb. 1, 2018

(86) PCT No.: PCT/JP2018/003439
§ 371 (c)(1),
(2) Date: Aug. 5, 2019

(87) PCT Pub. No.: WO2018/147161
PCT Pub. Date: Aug. 16, 2018

(65) Prior Publication Data
US 2020/0025285 A1 Jan. 23, 2020

(30) Foreign Application Priority Data
Feb. 8, 2017 (JP) ................. 2017-021502

(51) Int. Cl.
*F16H 57/04* (2010.01)
*F16H 1/28* (2006.01)
(Continued)

(52) U.S. Cl.
CPC .......... *F16H 57/0432* (2013.01); *F16H 1/28* (2013.01); *F16H 57/0486* (2013.01);
(Continued)

(58) Field of Classification Search
CPC .. F16H 57/0479; F16H 57/082; F16H 37/041; F16H 37/0813; F16H 2702/02
See application file for complete search history.

(56) References Cited

U.S. PATENT DOCUMENTS 6,743,148 B2 *  6/2004  Hayabuchi ............ F16H 57/082
                                                    475/331
6,890,280 B2 *  5/2005  Oshidari ............. F16H 57/0479
                                                    184/6.12
(Continued)

FOREIGN PATENT DOCUMENTS

JP       H08-270767 A       10/1996
JP       2009-162337 A       7/2009
(Continued)

*Primary Examiner* — Sherry L Estremsky
(74) *Attorney, Agent, or Firm* — Carrier Blackman & Associates, P.C.; William D. Blackman; Joseph P. Carrier (57) ABSTRACT

A transmission device is provided in which a support shaft is supported by a carrier, has planetary gears, supports the planetary gears, and is provided with an oil hole and a discharge hole communicating with the oil hole and having an outer end opening on the support shaft, wherein the support shaft has the oil hole, a discharge hole having an inner end communicating with the oil hole and having an outer end opening on the support shaft, and an engagement part provided on one end portion of the support shaft, the other end portion of the support shaft is fixed to the carrier, and a to-be-engaged part is provided on the transmission member, the engagement part engaging with the to-be-engaged part for positioning the support shaft at a position in which the outer end of the discharge hole faces outward in a radial direction of the carrier.

5 Claims, 10 Drawing Sheets

(51) Int. Cl.
*F16H 57/08* (2006.01)
*F16H 37/04* (2006.01)
*F16H 37/08* (2006.01)

(52) U.S. Cl.
CPC ......... *F16H 57/082* (2013.01); *F16H 37/041* (2013.01); *F16H 37/0813* (2013.01); *F16H 2702/02* (2013.01)

(56) References Cited

U.S. PATENT DOCUMENTS

| | | | | |
|---|---|---|---|---|
| 7,608,005 | B2 * | 10/2009 | Metten | F16H 57/0479 |
| | | | | 184/6.12 |
| 7,967,713 | B2 * | 6/2011 | Haupt | F16H 57/0427 |
| | | | | 475/160 |
| 8,251,862 | B2 * | 8/2012 | Burgman | F28F 9/262 |
| | | | | 475/348 |
| 8,905,894 | B2 * | 12/2014 | Koyama | F16H 57/082 |
| | | | | 475/331 |
| 9,447,863 | B2 | 9/2016 | Tonokura et al. | |
| 2009/0017954 | A1 * | 1/2009 | Nishida | F16H 57/0482 |
| | | | | 475/159 |

FOREIGN PATENT DOCUMENTS

| | | | | |
|---|---|---|---|---|
| JP | 2009-197821 | A | 9/2009 | |
| JP | 4606151 | B2 * | 1/2011 | ......... F16H 57/0479 |
| WO | 2014/054490 | A1 | 4/2014 | |

\* cited by examiner

TRANSMISSION DEVICE

TECHNICAL FIELD

The present invention relates to a transmission device that includes a planetary gear mechanism having a plurality of planetary gears that each mesh with a sun gear and a ring gear, a plurality of support shafts that rotatably extend through and support the plurality of planetary gears respectively, and a carrier that supports the plurality of support shafts, a transmission member that is adjacent to the carrier being joined to the carrier so as to rotate integrally therewith.

BACKGROUND ART

Conventionally, the structure of the above planetary gear mechanism in which a support shaft of a planetary gear is provided with an oil hole extending in the axial direction and a discharge hole communicating via its inner end with the oil hole and opening via its outer end on an outer peripheral face of the support shaft, and opposite end parts of the support shaft are fixed to a carrier in a state in which the discharge hole is made to face outward in the radial direction of the carrier is known (for example Patent Document 1). In the structure disclosed in Patent Document 1, when the carrier rotates, lubricating oil that has been supplied to the oil hole via the outer end of the support shaft is smoothly discharged from the discharge hole due to centrifugal force, and the area around the support shaft, for example a bearing, etc., can be lubricated efficiently.

RELATED ART DOCUMENTS

Patent Documents

Patent Document 1: Japanese Patent Application Laid-open No. 2009-197821

SUMMARY OF THE INVENTION

Problems to be Solved by the Invention

However, in the planetary gear mechanism of Patent Document 1 above, it is necessary in an assembly step to fix the support shaft to the carrier while carrying out positioning so that the discharge hole is made to face outward in the radial direction of the carrier, and the positioning step is complicated. Furthermore, in order to retain the support shaft, it is necessary to fix both of the opposite end parts of the support shaft to the carrier, and the number of fixing steps accordingly increases.

The present invention has been proposed in light of the above, and it is an object thereof to provide a transmission device that can solve the above problems of the conventional structure.

Means for Solving the Problems

In order to attain the above object, according to a first aspect of the present invention, there is provided a transmission device comprising a planetary gear mechanism having a plurality of planetary gears that each mesh with a sun gear and a ring gear, a plurality of support shafts that rotatably extend through and support the plurality of planetary gears respectively, and a carrier that supports the plurality of support shafts, a transmission member that is adjacent to the carrier being joined to the carrier so as to rotate integrally therewith, characterized in that each of the support shafts has an oil hole that extends in an axial direction of the support shaft, a discharge hole that has an inner end communicating with the oil hole and has an outer end opening on an outer peripheral face of the support shaft, and an engagement part that is provided on one end portion of the support shaft, the other end portion of the support shaft is fixed to the carrier, and a to-be-engaged part is provided on the transmission member, the engagement part engaging with the to-be-engaged part so as to be capable of positioning the support shaft at a position in which the outer end of the discharge hole faces outward in a radial direction of the carrier.

Further, according to a second aspect of the present invention, in addition to the first aspect, the oil hole extends through the support shaft in the axial direction, and an open end portion, on the transmission member side, of the oil hole is blocked by mutual engagement between the engagement part and the to-be-engaged part.

Furthermore, according to a third aspect of the present invention, in addition to the second aspect, the carrier and the transmission member are formed from separate components and integrally joined to each other, the carrier and the transmission member abut against each other on a periphery of the engagement part and the to-be-engaged part, and an abutment face between the carrier and the transmission member has a bent portion, in a cross section including a rotational axis of the carrier, on the outside, in the radial direction, of the support shaft.

Moreover, according to a fourth aspect of the present invention, in addition to any one of the first to third aspects, the to-be-engaged part is formed from an annular step part that is provided on a face, opposing the carrier, of the transmission member and is coaxial with the transmission member, and the engagement part has a shape such that the carrier can be positioned coaxially with the transmission member via the support shaft due to engagement between the engagement part and the step part.

Effects of the Invention

In accordance with the first aspect of the present invention, simply engaging the engagement part provided on one end portion of the support shaft supporting the planetary gear and the to-be-engaged part provided on the transmission member enables the support shaft to be easily and properly positioned at a position at which the discharge hole of the support shaft faces outward in the radial direction of the carrier. Moreover, merely fixing the other end portion of the support shaft to the carrier in the positioned state enables retention and prevention of rotation of the support shaft to be carried out simply by utilizing the transmission member. The number of steps for positioning and fixing the support shaft is thereby reduced, thus contributing to improvement of the ease of assembly of the device and reduction in the cost.

Furthermore, in accordance with the second aspect in particular, even when the oil hole is a through hole in the axial direction, it is possible by utilizing engagement between the engagement part and the to-be-engaged part to easily block the open end portion, on the transmission member side, of the oil hole, thereby making it possible to increase the amount of lubricating oil heading from the oil hole to the discharge hole side, and it becomes possible to efficiently lubricate a to-be-lubricated part in the area around the support shaft. Moreover, due to the oil hole being a through hole in the axial direction, compared with a case in which the oil hole is a bottomed hole, the ease of machining of the oil hole is improved.

Moreover, in accordance with the third aspect in particular, since the abutment face between the carrier and the transmission member, which are separate components, has a bent portion and extends as a labyrinth, the amount of lubricating oil that tries to leak along the abutment face by centrifugal force from the open end of the oil hole can be reduced. The amount of lubricating oil heading from the oil hole toward the discharge hole side can thereby be further increased.

Furthermore, in accordance with the fourth aspect in particular, it is possible by utilizing engagement between the engagement part and the to-be-engaged part (that is, positioning means for the support shaft equipped with the discharge hole) to carry out alignment of the carrier and the transmission member with each other. It is thus not necessary to specially provide, between the carrier and the transmission member, alignment means exclusively used for the carrier and the transmission member, thus contributing to simplification of the structure of the device and a further reduction in the cost.

EXPLANATION OF REFERENCE NUMERALS AND SYMBOLS

P Planetary gear mechanism
h1 Oil hole
h1e Open end portion of oil hole
h2 Discharge hole
h2o Outer end of discharge hole
K Cutout face (engagement part)
L Rotational axis
L' Axis of support shaft
S Step part (to-be-engaged part)

10 Differential case (transmission member)
31 Sun gear
32 Ring gear
33 Planetary gear
34 Support shaft
34a, 34b One end portion and other end portion of support shaft
35 Carrier
200 Abutment face
200a Bent portion of abutment face

MODES FOR CARRYING OUT THE INVENTION

Embodiments of the present invention are explained by reference to the drawings.

First Embodiment

Figure 1:
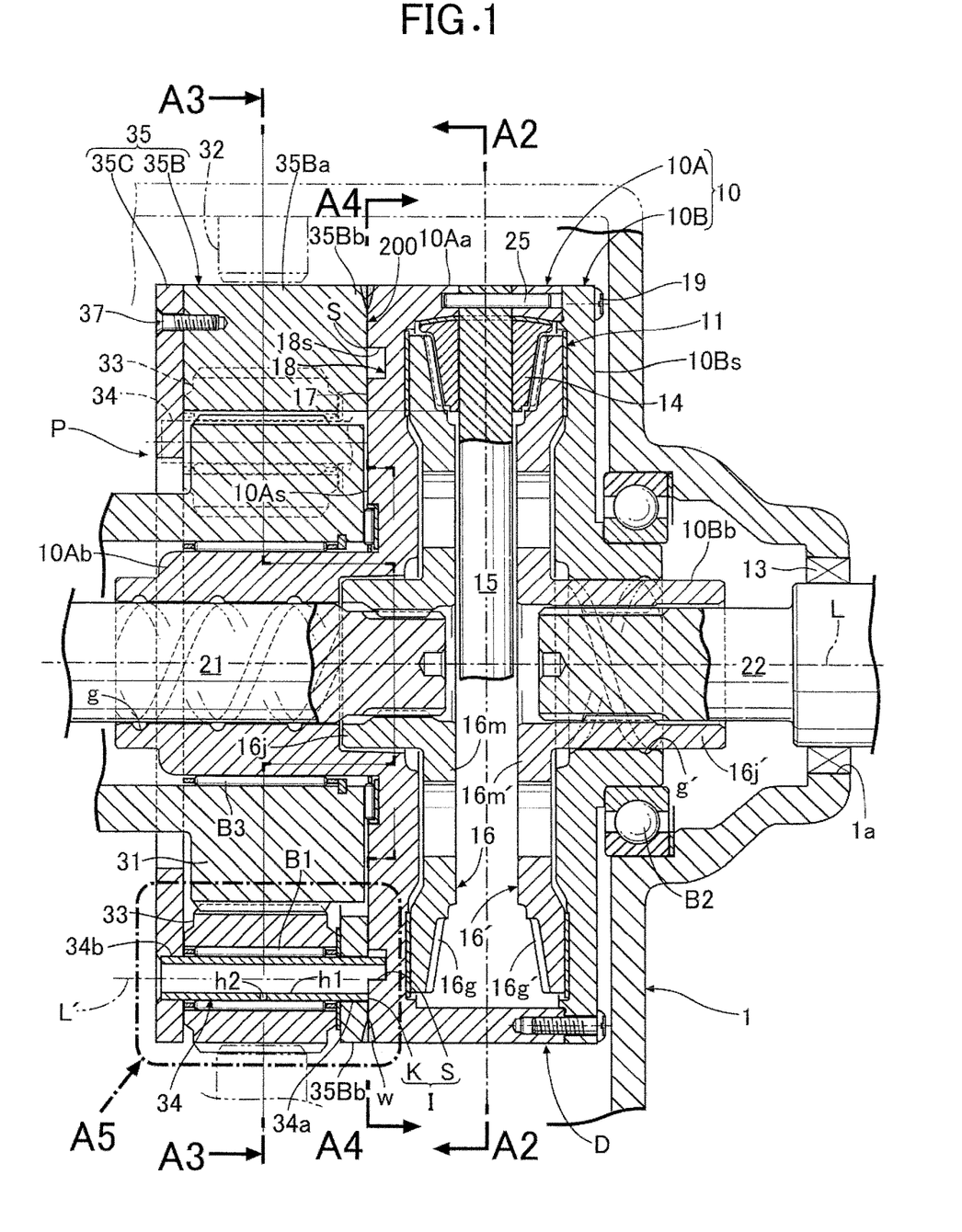
FIG. 1 is a longitudinal sectional view of a transmission device including a differential device and a reduction gear mechanism related to a first embodiment of the present invention. (first embodiment)
Figure 2:
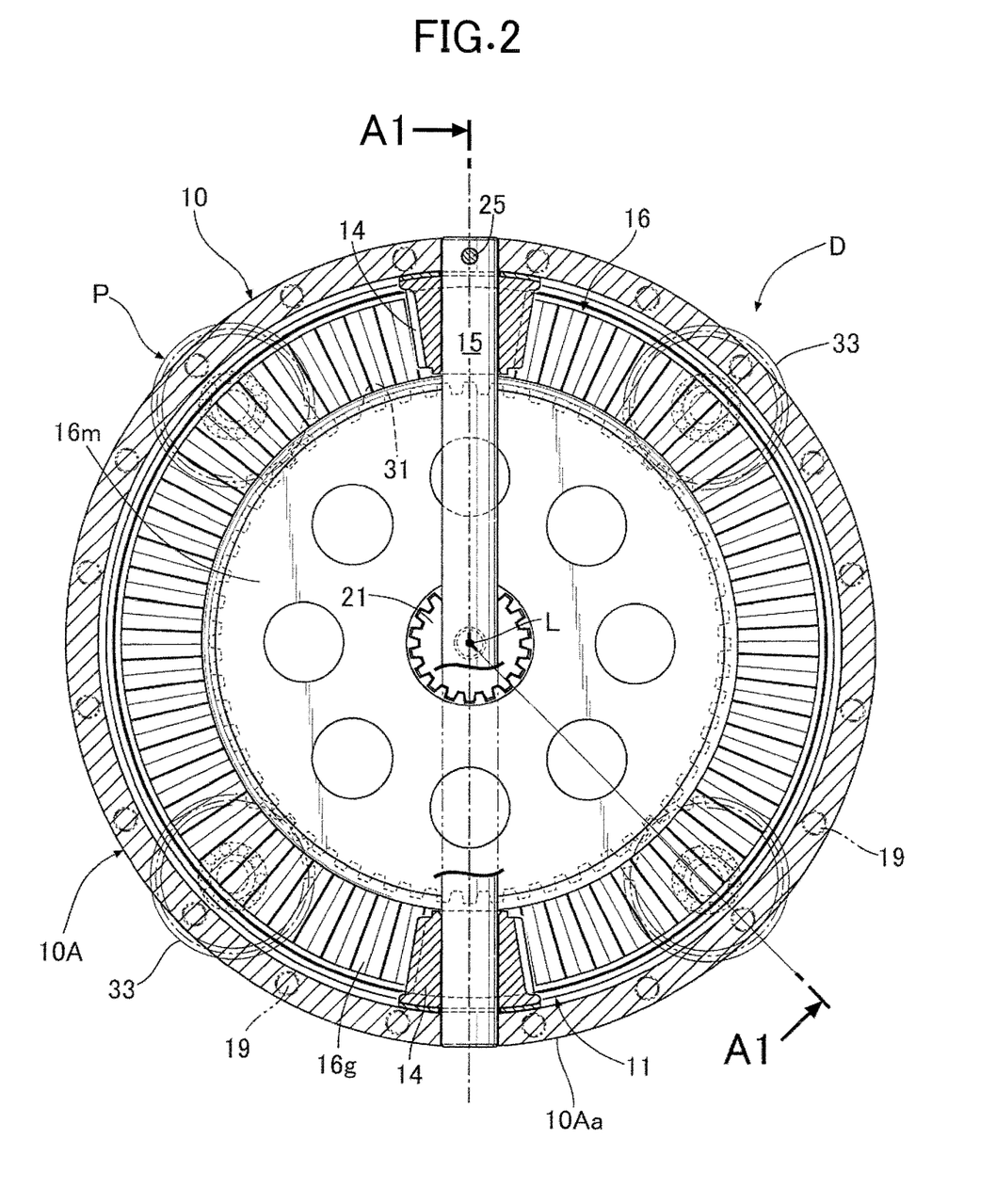
FIG. 2 is a sectional view along line A2-A2 in FIG. 1. (first embodiment)

First, referring to FIG. 1 to FIG. 6, a first embodiment of the present invention is explained. In FIG. 1, a differential device D is connected to an engine or a motor (not illustrated) mounted on an automobile as a power source via a planetary gear mechanism P functioning as a reduction mechanism. The differential device D transmits rotational power, transmitted from the engine to a differential case 10 of the differential device D via the planetary gear mechanism P, by distributing it between first and second output shafts 21 and 22 connected to a pair of left and right axles, which are not illustrated, thus driving the two axles while allowing differential rotation between the two axles.

The differential device D is housed and supported together with the planetary gear mechanism P within a transmission case 1 disposed next to the engine in for example a vehicle body front part. A conventionally known transmission system (not illustrated) including a power connection/disconnection device, a speed change device, etc. is disposed between the engine and the planetary gear mechanism P. Specific examples of the planetary gear mechanism P and the differential device D are now explained in sequence.

The planetary gear mechanism P includes a sun gear 31 that is relatively rotatable around the same axis with respect to the differential case 10 of the differential device D, a large diameter ring gear 32 that concentrically surrounds the sun gear 31 and is fixed to an inner wall of the transmission case 1, a plurality of (for example, four) planetary gears 33 that are disposed between the sun gear 31 and the ring gear 32 and mesh with the sun gear 31 and the ring gear 32, a plurality of support shafts 34 that rotatably extend through and support the plurality of planetary gears 33 via a bearing B1 (for example a needle bearing), and a carrier 35 that receives the plurality of planetary gears 33 and supports opposite end parts of the plurality of support shafts 34. The carrier 35 is joined to the differential case 10 so that they can rotate as a unit on the same axis L. The plurality of support shafts 34 are arranged at equal intervals on the same circumference c having its center on the rotational axis L of the carrier 35.

The sun gear 31 can be rotated by the engine via the transmission system. A rotational force inputted into the sun gear 31 is transmitted to the differential case 10 while being reduced in speed via the planetary gear 33, the support shaft 34 and the carrier 35 in sequence.

The carrier 35 has for example a carrier main body 35B that has the same diameter as and is coaxial with the differential case 10, and a disk-shaped lid 35C that is joined to the outer end of the carrier main body 35B. The carrier main body 35B has a main body base portion 35Bb that is formed into a circular ring plate shape and is adjacent to and fixed to the differential case 10, and a plurality of, for example four, main body arm portions 35Ba that are projectingly provided integrally with the main body base portion 35Bb with gaps therebetween in the peripheral direction and extend outward in the axial direction (that is, the side opposite to the differential case 10).

Figure 3:
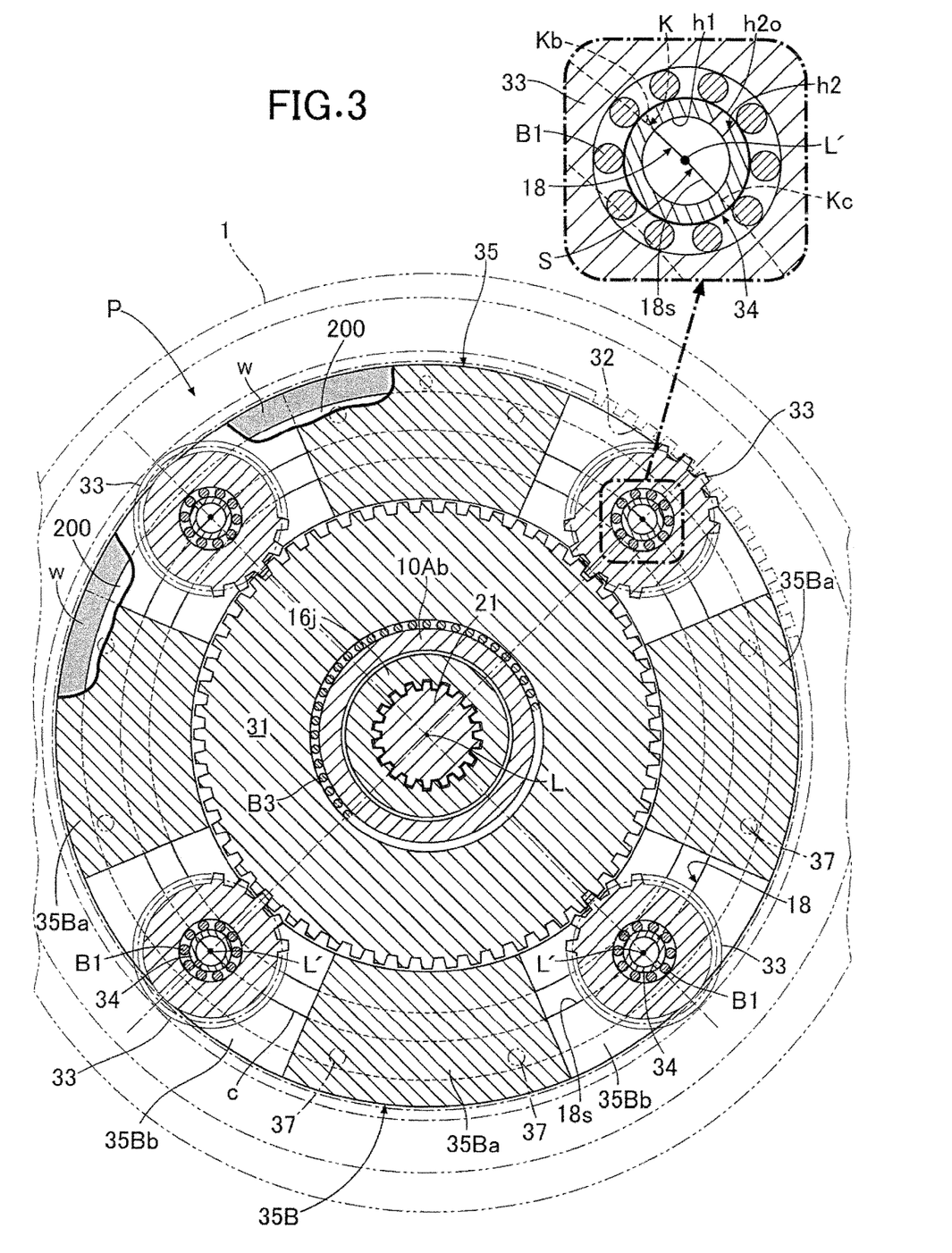
FIG. 3 is a sectional view along line A3-A3 in FIG. 1. (first embodiment)
Figure 4:
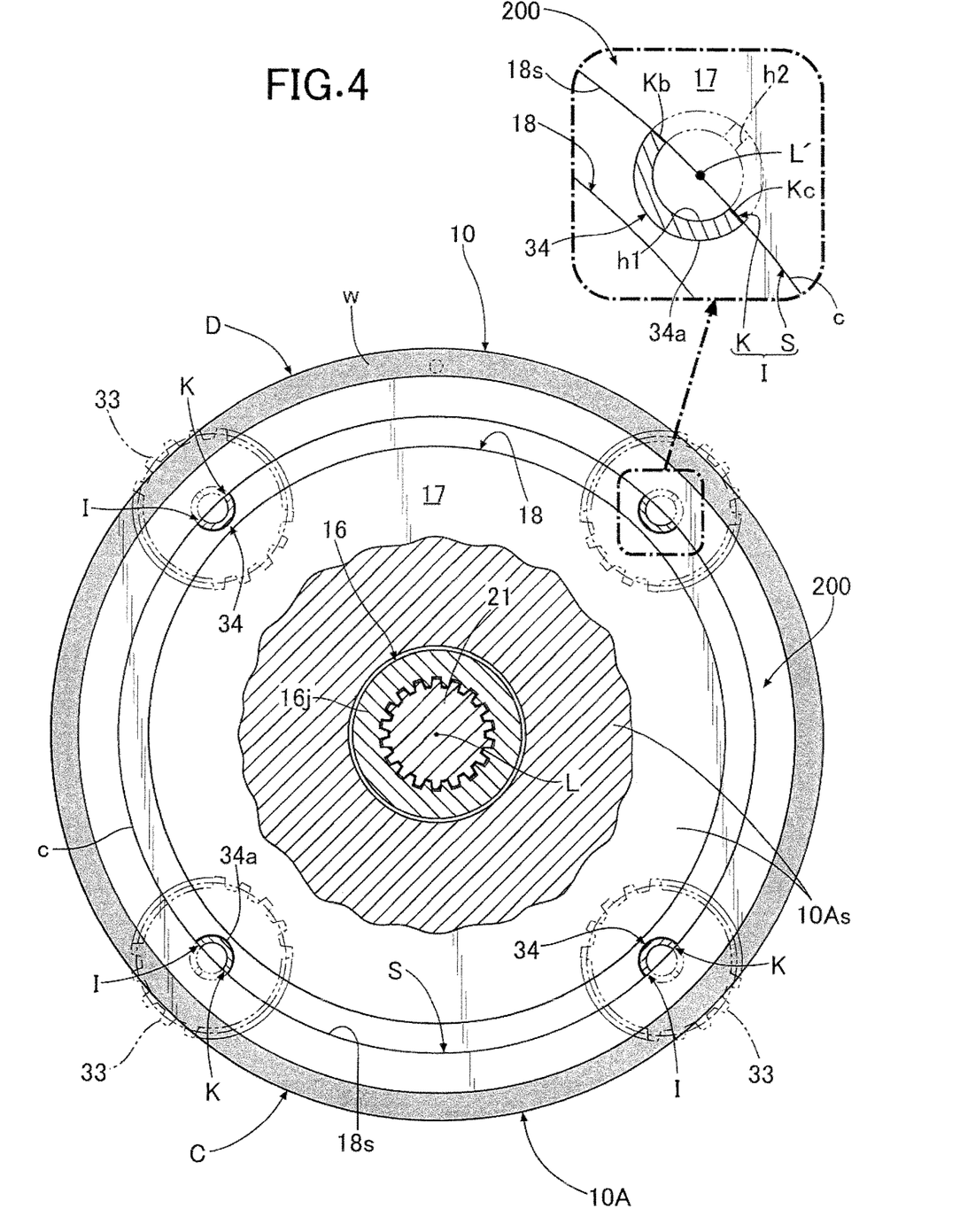
FIG. 4 is a sectional view along line A4-A4 in FIG. 1. (first embodiment)

As is clearly shown in FIG. 3, each of the main body arm portions 35Ba is formed into a fan shape when viewed on a projection plane orthogonal to the rotational axis L of the carrier 35. Therefore, spaces opening to the outside and having a fan shape on the projection plane are formed between the main body arm portions 35Ba, which are adjacent to each other with gaps therebetween in the peripheral direction of the carrier 35, and the planetary gear 33 is disposed in each of the spaces together with the support shaft 34. The lid 35C is detachably joined to the extremity of each of the main body arm portions 35Ba by means of a bolt 37.

As means for joining the lid 35C, appropriate joining means other than a bolt (for example swaging, welding, etc.) may be used. If the structure enables machining and assembly of the carrier 35 or attachment of the planetary gear 33 and the support shaft 34 to the carrier 35, for example the lid 35C may be formed integrally with the carrier main body 35B.

Figure 6:
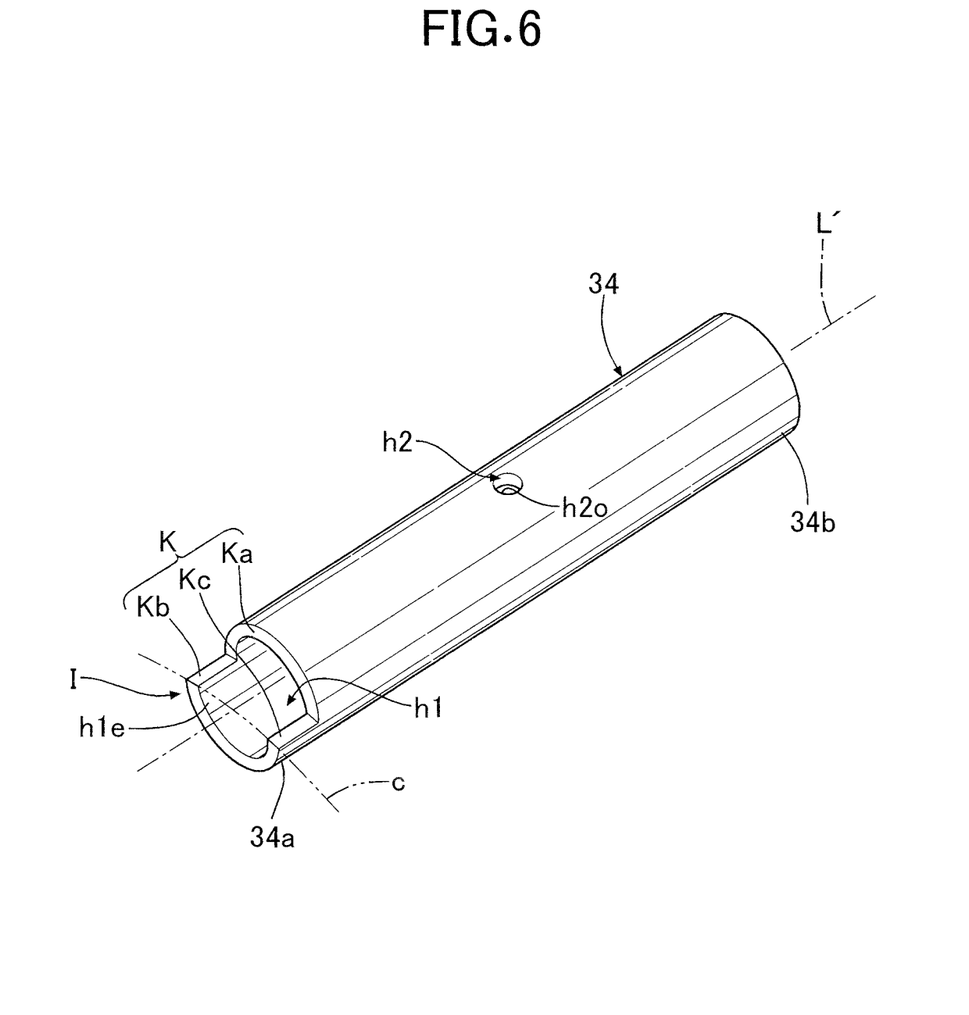
FIG. 6 is a perspective view of a support shaft on its own. (first embodiment)

In the present embodiment, each of the support shafts 34 is formed into a hollow cylindrical shape having opposite ends open, and an inner peripheral face of the support shaft 34 acts as an oil hole h1 that extends through the interior of the support shaft 34 in the axial direction. Furthermore, at least one discharge hole h2 is provided in a peripheral wall of an intermediate part of the support shaft 34 (in particular a peripheral wall portion positioned on the outermost side in the radial direction of the carrier 35), the inner end of the discharge hole h2 communicating directly with the oil hole h1 and an outer end h2o of the discharge hole h2 opening on an outer peripheral face of the peripheral wall.

One end portion 34a (the right end part in FIG. 1) on the differential case 10 side of each of the support shafts 34 is fitted into and supported on a through hole 35Bbh of the carrier main body 35B (more specifically the main body base portion 35Bb), whereas the other end portion 34b (the left end part in same) is fitted into and supported on a through hole 35Ch of the lid 35C. Among the opposite end parts 34a and 34b of the support shaft 34, only the other end portion 34b in particular is joined to the carrier 35. For example in the present embodiment, swaging around the lid 35C a swaged portion 35Cf that is latched on the other end portion 34b joins the other end portion 34b to the lid 35C.

As means for joining the other end portion 34b and the lid 35C, appropriate joining means other than swaging (for example welding means, a snap ring that is latched on the outer periphery of the other end portion 34b and is engaged with an inside face of the lid 35C, a retaining pin that transects the other end portion 34b and is inserted into the lid 35C, etc.) can be used.

Positioning means I is provided between the one end portion 34a of each of the support shafts 34 and the differential case 10, the positioning means I positioning the support shaft 34 at a specific rotational position at which the outer end h2o of the discharge hole h2 faces outward in the radial direction of the carrier 35. The structure of the positioning means I is described later.

A specific example of the differential device D is now explained. The differential device D in the present embodiment includes the differential case 10 and a differential gear mechanism 11 that is housed within the differential case 10.

One end part (the right end part in FIG. 1) in the axial direction of the differential case 10 is rotatably supported on the transmission case 1 via a bearing B2. On the other hand, on the other end part (the left end part in FIG. 1) side of the differential case 10, at least one of the sun gear 31, the carrier 35 and the first output shaft 21 is rotatably supported on the transmission case 1, although this is not illustrated. A joined body of the differential case 10 and the carrier 35, which rotate as a unit, is thereby rotatably supported on the transmission case 1.

A through hole 1a (a through hole on the first output shaft 21 side not being illustrated) is formed in the transmission case 1, the first and second output shafts 21 and 22 each being inserted into the through hole 1a. An annular seal member 13 is disposed between the inner periphery of each of the through holes 1a and the outer periphery of each of the output shafts 21 and 22.

An oil pan (not illustrated) is provided in a bottom part of the transmission case 1, the oil pan facing an internal space of the transmission case 1 and storing lubricating oil. Lubricating oil within the oil pan is agitated and scattered by rotation of the differential case 10, etc. within the transmission case 1, thereby enabling moving parts within the transmission case 1, for example each movable part of the planetary gear mechanism P or the differential gear mechanism 11, to be lubricated.

The differential gear mechanism 11 includes a plurality of (two in the present embodiment) pinion gears 14 housed within the differential case 10, a pinion shaft 15 housed within the differential case 10 and rotatably supporting the pinion gear 14, and first and second side gears 16 and 16' housed within the differential case 10 and meshing with the pinion gears 14 from left and right sides respectively.

Each pinion gear 14 is supported on the differential case 10 via the pinion shaft 15. Each pinion gear 14 can thereby spin around the axis of the pinion shaft 15 with respect to the differential case 10 and can revolve around the rotational axis L of the differential case 10 accompanying rotation of the differential case 10.

The pinion shaft 15 is disposed within the differential case 10 so as to be orthogonal to the rotational axis L of the differential case 10. Opposite end parts of the pinion shaft 15 are inserted through and supported on the differential case 10 (a tube portion 10Aa of the first case half body 10A, which is described later) and fixed by appropriate fixing means (in the present embodiment a retaining pin 25).

The first and second side gears 16 and 16' integrally include for example cylindrical shaft portions 16j and 16j' into which inner end parts of the first and second output shafts 21 and 22 are respectively spline fitted, annular tooth portions 16g and 16g' that are present at a position spaced outward in the radial direction from the shaft portions 16j and 16j' and have a tooth face meshing with the pinion gear 14, and intermediate wall portions 16m and 16m' that are formed into a flat ring-plate shape extending outward in the radial direction from inner end parts of the shaft portions 16j and 16j' toward inner peripheral end parts of the tooth portions 16g and 16g'.

The differential case 10 is formed so that it can be split into at least two case elements, for example first and second case half bodies 10A and 10B. Among them, the first case half body 10A includes a disk-shaped first side wall portion 10As that is adjacent to and fixed to the carrier 35 and has its inside face opposing a back face of the first side gear 16, a short cylindrical tube portion 10Aa that is integrally connected to an end part of the outer periphery of the first side wall portion 10As and extends toward the second case half body 10B side, and a first boss portion 10Ab that extends cylindrically outward in the axial direction from a middle part of an outside face of the first side wall portion 10As.

The sun gear 31 is rotatably fitted onto and supported on the outer periphery of the first boss portion 10Ab via a bearing B3. The first output shaft 21 is rotatably fitted into and supported on the inner periphery of the first boss portion 10Ab, and the shaft portion 16j of the first side gear 16 is fitted into the inner periphery of the first boss portion 10Ab directly or via a clearance.

An outside face, opposing the carrier 35, of the first side wall portion 10As is a carrier receiving face 17, which is flat and abuts against and supports an end face of the carrier main body 35B (more specifically, an outer end face of the main body base portion 35Bb) in a surface contact state. A thrust bearing is disposed as required between mutually opposing faces of the carrier receiving face 17 and the sun gear 31.

On the other hand, the second case half body 10B includes a second side wall portion 10Bs that is formed into a disk shape so as to block an open end of the first case half body 10A and has its inside face opposing a back face of the second side gear 16', and a second boss portion 10Bb that extends cylindrically outward in the axial direction from a middle part of an outside face of the second side wall portion 10Bs. The shaft portion 16j' of the second side gear 16' is rotatably fitted into and supported on the inner periphery of the second boss portion 10Bb.

An inside face of an outer peripheral end part of the second side wall portion 10Bs abuts against an end face of the tube portion 10Aa of the first case half body 10A. The second case half body 10B is detachably joined to the first case half body 10A with joining means such as a bolt 19. As the joining means, appropriate joining means other than the bolt 19, such as for example swaging, adhering or welding, may be employed.

The back faces of the tooth portions 16g and 16g' of the first and second side gears 16 and 16' are rotatably supported on the first and second side wall portions 10As and 10Bs directly or via a thrust washer. A back face of a tooth portion of the pinion gear 14 is also rotatably supported on a corresponding inner face of the tube portion 10Aa of the first case half body 10A directly or via a thrust washer.

Helical grooves g and g' are formed in one of mating faces between the boss portion 10Ab of the first case half body 10A and the first output shaft 21 (for example an inner peripheral face of the boss portion 10Ab) and one of mating faces between the boss portion 10Bb of the second case half body 10B and the shaft portion 16j' of the second side gear 16' (for example an inner peripheral face of the boss portion 10Bb). The helical grooves g and g' can exhibit a screw pump action accompanying relative rotation between the mating faces and can draw in scattered lubricating oil within the transmission case 1 to the interior of the differential case 10.

Figure 5:
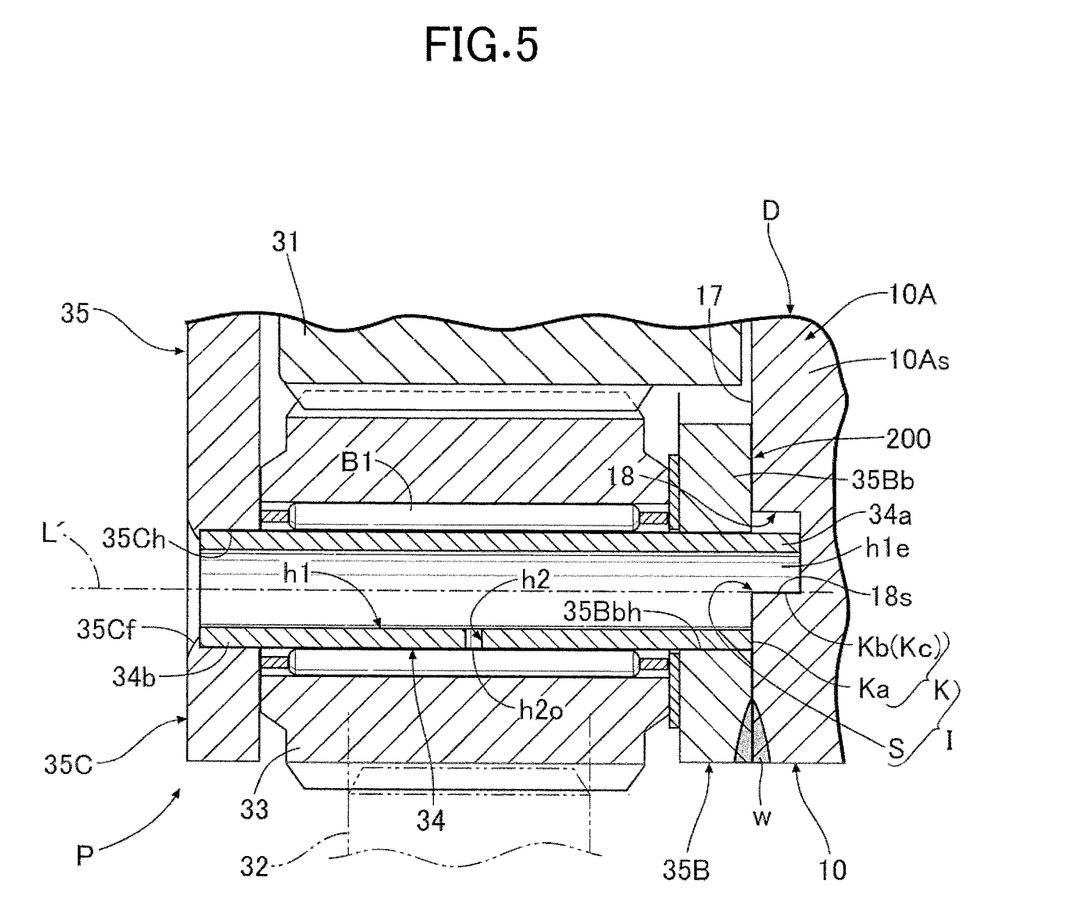
FIG. 5 is an enlarged sectional view of a part shown by arrow A5 in FIG. 1. (first embodiment)

An annular positioning groove 18 concentric with the differential case 10 is formed at a position, corresponding to the support shaft 34, of the carrier receiving face 17 of the first case half body 10A, and part (the extremity) of the one end portion 34a of the support shaft 34 is received by the positioning groove 18. An inside face 18s on the outer peripheral end side of the positioning groove 18 and the carrier receiving face 17 continuous therefrom form an annular positioning step part S. This step part S is a constituent element on the differential case 10 side of the positioning means I and is one example of the to-be-engaged part of the present invention.

A constituent element on the support shaft 34 side of the positioning means I is formed as a specific shape formed on the one end portion 34a, projecting outside the carrier main body 35B, of the support shaft 34, for example a cutout face K. The cutout face K is one example of the engagement part of the present invention.

The cutout face K is formed into a shape that is missing a substantially semicircular part of the extremity of the one end portion 34a of the support shaft 34, and is engaged with the step part S. In accordance with this engagement, it is possible to position the support shaft 34, which is fitted into the through holes 35Bbh and 35Ch, at a specific rotational position around a self axis L' (that is, a rotational position at which the outer end h2o of the discharge hole h2 faces outward in the radial direction of the carrier 35).

In order to carry out the positioning of the support shaft 34, the cutout face K has a first engagement face Ka formed as a flat face orthogonal to the axis L' of the support shaft 34 and extending as a semi-arc shape around the axis L', and a pair of second engagement faces Kb and Kc each formed as an arc face having their center on the rotational axis L of the carrier 35, arranged with a gap therebetween in the peripheral direction of the carrier 35, and extending in the axial direction.

In a state in which the cutout face K and the step part S are engaged, an extremity face of the one end portion 34a of the support shaft 34 is in contact with a bottom face of the positioning groove 18, the first engagement face Ka of the cutout face K is in contact with the carrier receiving face 17, and the second engagement faces Kb and Kc of the cutout face K are in contact with the inside face 18s on the outer peripheral side of the positioning groove 18. Due to such contact, an open end face of the one end portion 34a of the support shaft 34 (that is, an open end portion h1e on the differential case 10 side of the oil hole h1) is blocked by the first case half body 10A as a blocking wall. The other end portion 34b of the support shaft 34 opens within the transmission case 1, and scattered lubricating oil within the transmission case 1 can directly enter the oil hole h1 via the opening.

In this way, even when the oil hole h1 of the support shaft 34 is a through hole in the axial direction, it is possible by utilizing engagement between the cutout face K and the step part S to easily and properly block the open end portion h1e, on the differential case 10 side, of the oil hole h1. It is thereby possible to increase the amount of lubricating oil heading from the oil hole h1 to the discharge hole h2 side, and it becomes possible to efficiently lubricate a to-be-lubricated part in the area around the support shaft 34 (for example the bearing B1 on the inner periphery of the planetary gear 33). Moreover, due to the oil hole h1 being a through hole in the axial direction, compared with a case in which the oil hole h1 is a bottomed hole, the ease of machining of the oil hole h1, that is, the support shaft 34, is improved.

Furthermore, in accordance with the engagement of the pair of second engagement faces Kb and Kc and the step part S in particular, the support shaft 34 can be positioned with respect to the carrier 35 at a specific rotational position in which the outer end h2o of the discharge hole h2 faces outward in the radial direction of the carrier 35, and it is also possible to carry out concentric alignment of the carrier 35 with the first case half body 10A via the plurality of support shafts 34 arranged on the same circumference c concentric with the carrier 35. That is, the positioning means I for positioning the support shaft 34 at a specific rotational position with respect to the carrier 35 is also used as means for carrying out alignment of the carrier 35 with the differential case 10, alignment means exclusively used therefor becomes unnecessary, and the structure of the transmission device including the planetary gear mechanism P and the differential device D can be simplified, thereby reducing the cost.

Mutually opposing faces of the carrier 35 and the first case half body 10A thus subjected to alignment as above are integrally joined by a weld w over the entire periphery. The carrier 35 is thereby joined to and united with the first case half body 10A. The operation of welding may be carried out, in a state in which the carrier 35 and the first case half body 10A are concentrically opposed and abutted against each other, by for example laser welding an outer peripheral part of an abutment face 200 using a welding laser torch deployed outward in the radial direction.

The operation of the first embodiment is now explained. With regard to the differential device D of the present embodiment, in a situation in which the differential case 10 receives rotational power from the engine via the planetary gear mechanism P, when the pinion gear 14 does not spin around the pinion shaft 15 but revolves around the rotational axis L of the differential case 10 together with the differential case 10, the left and right side gears 16 and 16' are rotated at the same speed via the pinion gear 14 from the differential case 10, and the driving forces of the side gears 16 and 16' are equally transmitted to the left and right first and second output shafts 21 and 22. When a difference occurs in the rotational speed between the first and second output shafts 21 and 22 due to the automobile turning, the pinion gear 14 revolves around the rotational axis L of the differential case 10 while spinning, thereby transmitting the rotational force from the pinion gear 14 to the left and right side gears 16 and 16' while allowing differential rotation. The above is the same as in the operation of a conventionally known differential device.

With regard to a method for assembling the carrier 35 and the differential case 10 of the present embodiment, there can be considered for example a first assembly method in which in a state in which the carrier 35 and the differential case 10 are provisionally aligned by means of a jig, the support shaft 34 supporting the planetary gear 33 is, with engagement between the cutout face K and the step part S, positioned and permanently fixed to the carrier 35, and subsequently the carrier 35 and the differential case 10 are permanently joined to each other, and a second assembly method in which the support shaft 34 supporting the planetary gear 33 is provisionally assembled in advance to the carrier 35 in a state in which it is detached from the differential case 10, and subsequently positioning and permanent fixing of the support shaft 34 to the carrier 35 and alignment and permanent joining of the carrier 35 and the differential case 10 to each other are carried out so as to oppose and abut the differential case 10 against the carrier 35 while engaging the cutout face K and the step part S with each other.

In the first assembly method, while retaining the carrier 35 and the first case half body 10A by means of a jig (not illustrated) so as to be concentrically adjacent to each other, the planetary gear 33 is disposed within the carrier 35, the support shaft 34 is inserted through a center hole of the planetary gear 33 via the bearing B1, and the opposite end parts 34a and 34b of the support shaft 34 are fitted into the through holes 35Bbh and 35Ch of the carrier 35. Engaging the cutout face K and the step part S with each other carries out positioning of the support shaft 34 at a specific rotational position, and the other end portion 34b of the support shaft 34 thus positioned is joined to the carrier 35 (the lid 35C) by swaging. Subsequently, the jig is removed, and in this process since the first case half body 10A is aligned with the carrier 35 due to engagement between the cutout face K and the step part S, the aligned state can be retained without the jig, and in this state an outer peripheral part of the abutment face 200 between the carrier 35 and the first case half body 10A is welded by the weld w, thus concentrically joining the carrier 35 and the first case half body 10A as a unit.

On the other hand, in the second assembly method, the planetary gear 33 is disposed within the carrier 35, which is separated from the first case half body 10A, the support shaft 34 is inserted through the center hole of the planetary gear 33 via the bearing B1, the opposite end parts 34a and 34b of the support shaft 34 are fitted into the through holes 35Bbh and 35Ch of the carrier 35, and in this process the support shaft 34 is provisionally positioned by utilizing the orientation of the cutout face K. In this state, the first case half body 10A is brought up to and made to adjoin the carrier 35, and in this process engaging the cutout face K and the step part S with each other enables permanent positioning of the support shaft 34 at a specific rotational position and alignment of the carrier 35 with the first case half body 10A to be carried out. Subsequently, the other end portion 34b of the support shaft 34 is joined by swaging, and an outer peripheral part of the abutment face 200 between the carrier 35 and the first case half body 10A is welded with the weld w, thereby concentrically joining the carrier 35 and the first case half body 10A as a unit.

After joining the carrier 35 and the first case half body 10A as a unit by the first or second assembly method, the first and second case half bodies 10A and 10B are joined to each other in a state in which the side gears 16 and 16', the pinion gear 14 and the pinion shaft 15 are set therebetween, thus completing assembly of the differential device D. Subsequently, an assembly of the differential device D and the carrier 35 is attached to the transmission case 1. Attachment of the sun gear 31 may be carried out before or after joining the carrier 35 to the first case half body 10A.

In the assembly process of the first embodiment described above, simply engaging the cutout face K (engagement part) of the one end portion 34a of the support shaft 34 and the step part S (to-be-engaged part) of the first case half body 10A as a transmission member enables the support shaft 34 to be easily and properly positioned at a specific rotational position at which the discharge hole h2 faces outward in the radial direction of the carrier 35. Moreover, merely fixing the other end portion 34b of the support shaft 34 to the carrier 35 (more specifically joining to the lid 35C by swaging) in the positioned state enables retention and prevention of rotation of the support shaft 34 to be carried out simply by utilizing the first case half body 10A. The number of steps for positioning and fixing the support shaft 34 are thereby reduced, the ease of assembly of the transmission device is improved, and the cost can be reduced. In addition, compared with a case in which a to-be-engaged part is provided on the carrier 35 side, the structure of the carrier 35 can be simplified, and it is advantageous in terms of strength.

Second Embodiment

Figure 7:
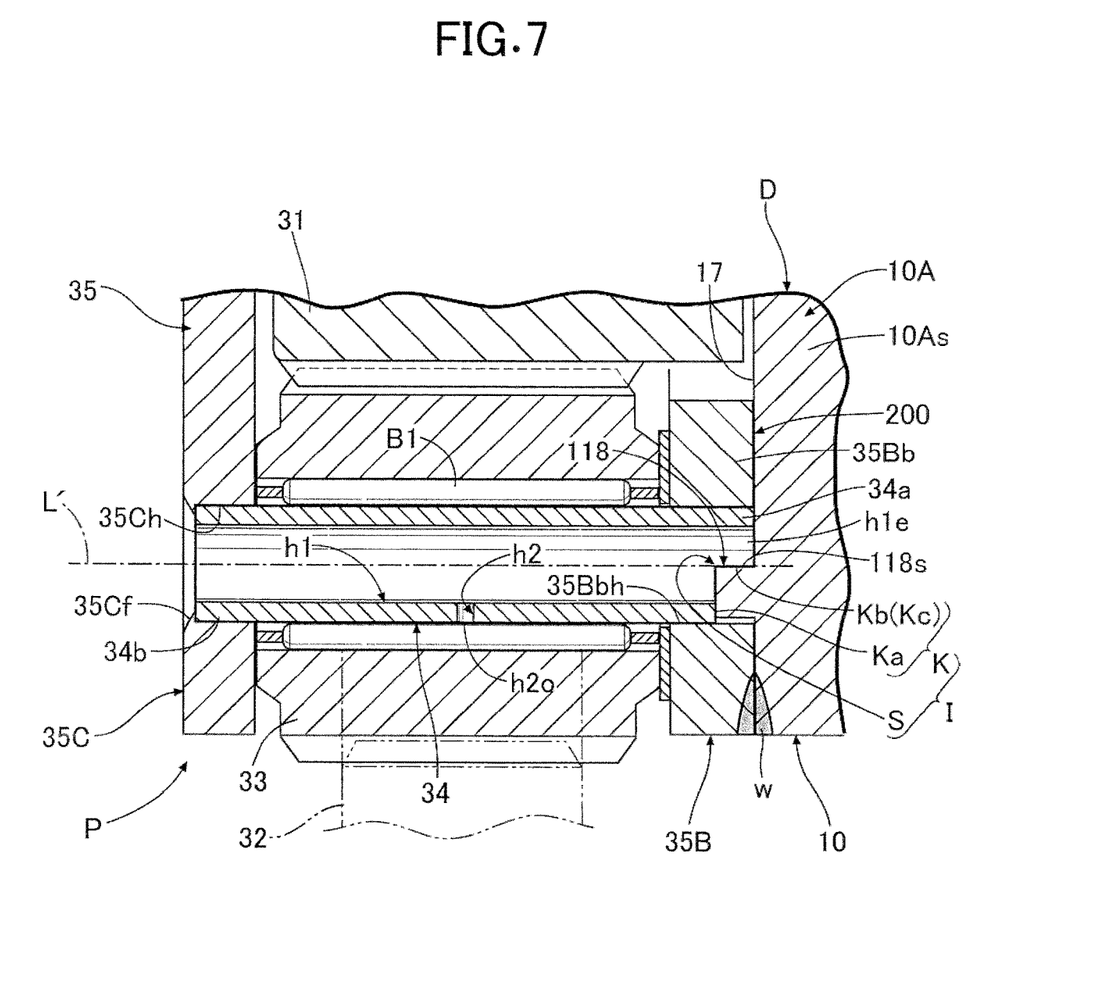
FIG. 7 is an enlarged sectional view (a view corresponding to FIG. 5) of an essential part of a transmission device related to a second embodiment of the present invention. (second embodiment)

A second embodiment of the present invention is now explained by reference to FIG. 7.

In the first embodiment, the annular step part S (to-be-engaged part) of the first case half body 10A as a transmission member is formed from the inside face 18s on the outer peripheral side of the annular positioning groove 18, which is recessed in the carrier receiving face 17 of the first case half body 10A, and the carrier receiving face 17, which is continuous from the annular step part S. In contrast, in the second embodiment, an annular projection 118 concentric with the differential case 10 is formed on the carrier receiving face 17 of the first case half body 10A, and the annular step part S (to-be-engaged part) is formed from a side face 118s on the inner periphery and an extremity face of the projection 118.

In a state in which the cutout face K and the step part S of the second embodiment are engaged, an extremity face of the one end portion 34a of the support shaft 34 is in contact with the carrier receiving face 17, the first engagement face Ka of the cutout face K is in contact with an extremity face of the projection 118, and the second engagement faces Kb and Kc of the cutout face K are in contact with the side face 118s on the inner peripheral side of the projection 118. Due to such contact, an open end face of the one end portion 34a of the support shaft 34 (that is, the open end portion h1e on the differential case 10 side of the oil hole h1) is blocked by the first case half body 10A as a blocking wall.

The arrangement of the second embodiment is otherwise basically the same as that of the first embodiment; constituent elements are denoted by the same reference numerals and symbols as those for the corresponding constituent elements of the first embodiment, and further detailed explanation is omitted. In accordance with the second embodiment, basically the same operational effects as those of the first embodiment can also be achieved.

Third Embodiment

Figure 8:
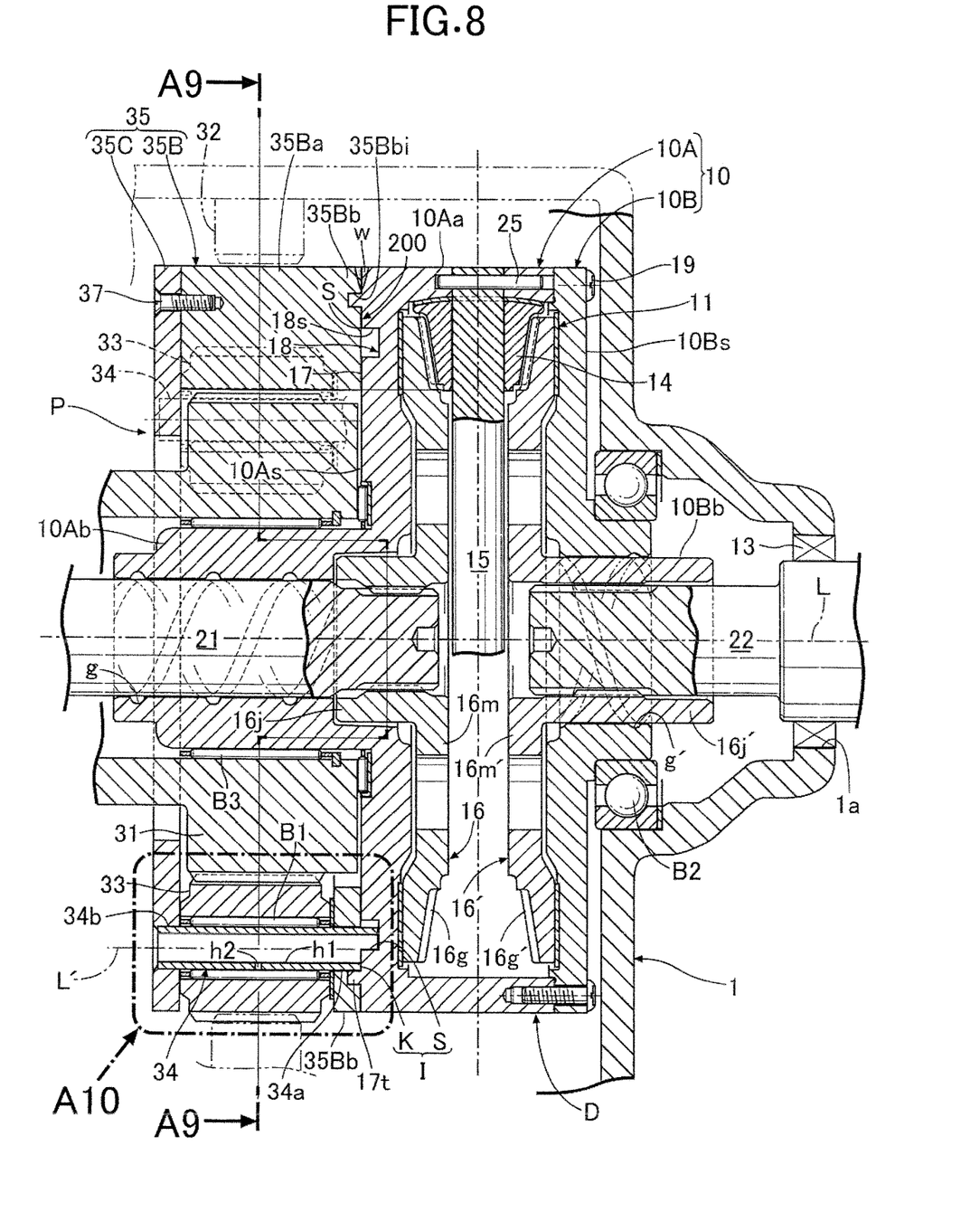
FIG. 8 is a longitudinal sectional view (a view corresponding to FIG. 1) of a transmission device related to a third embodiment of the present invention. (third embodiment)
Figure 9:
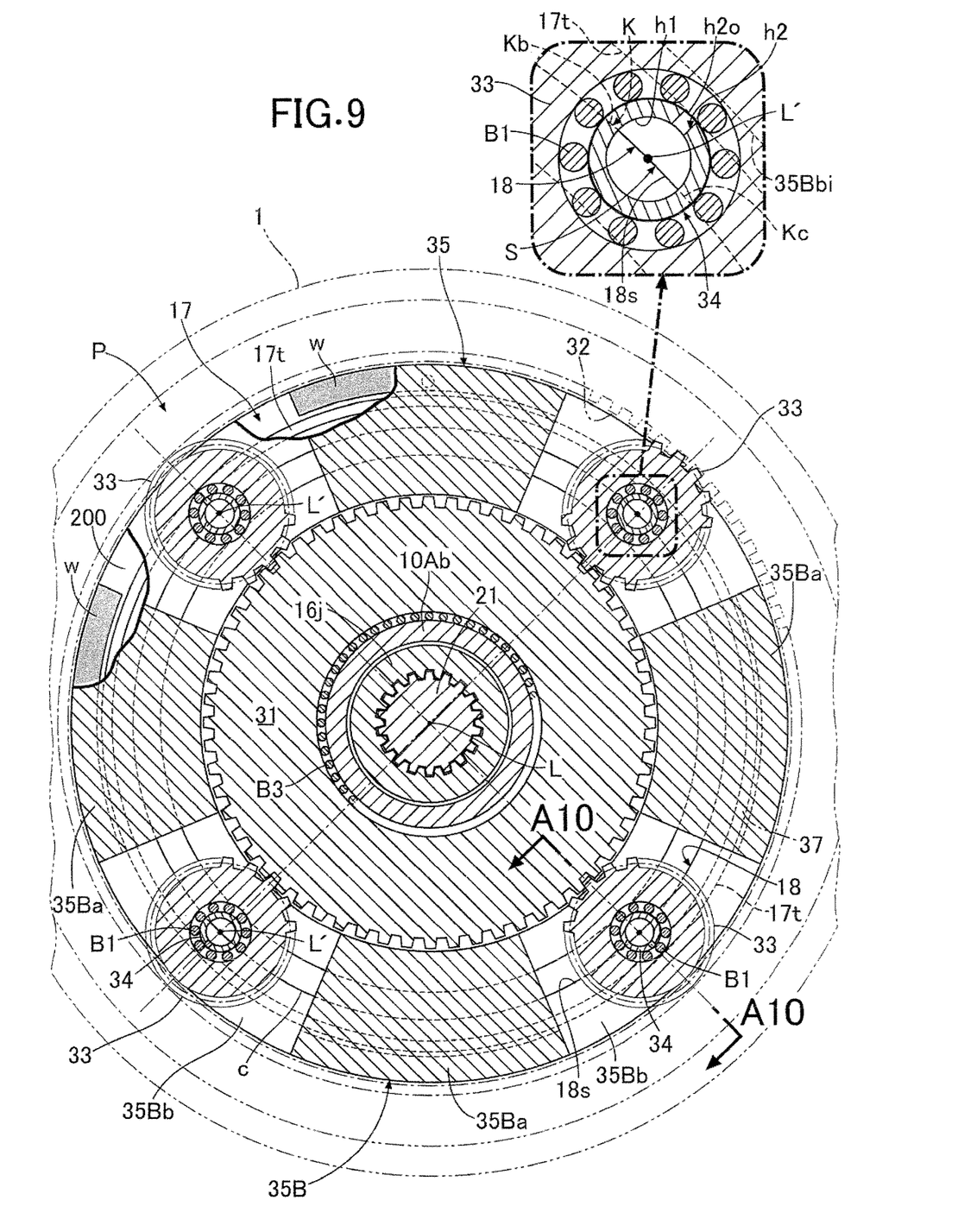
FIG. 9 is a sectional view (a view corresponding to FIG. 3) along line A9-A9 in FIG. 8. (third embodiment)
Figure 10:
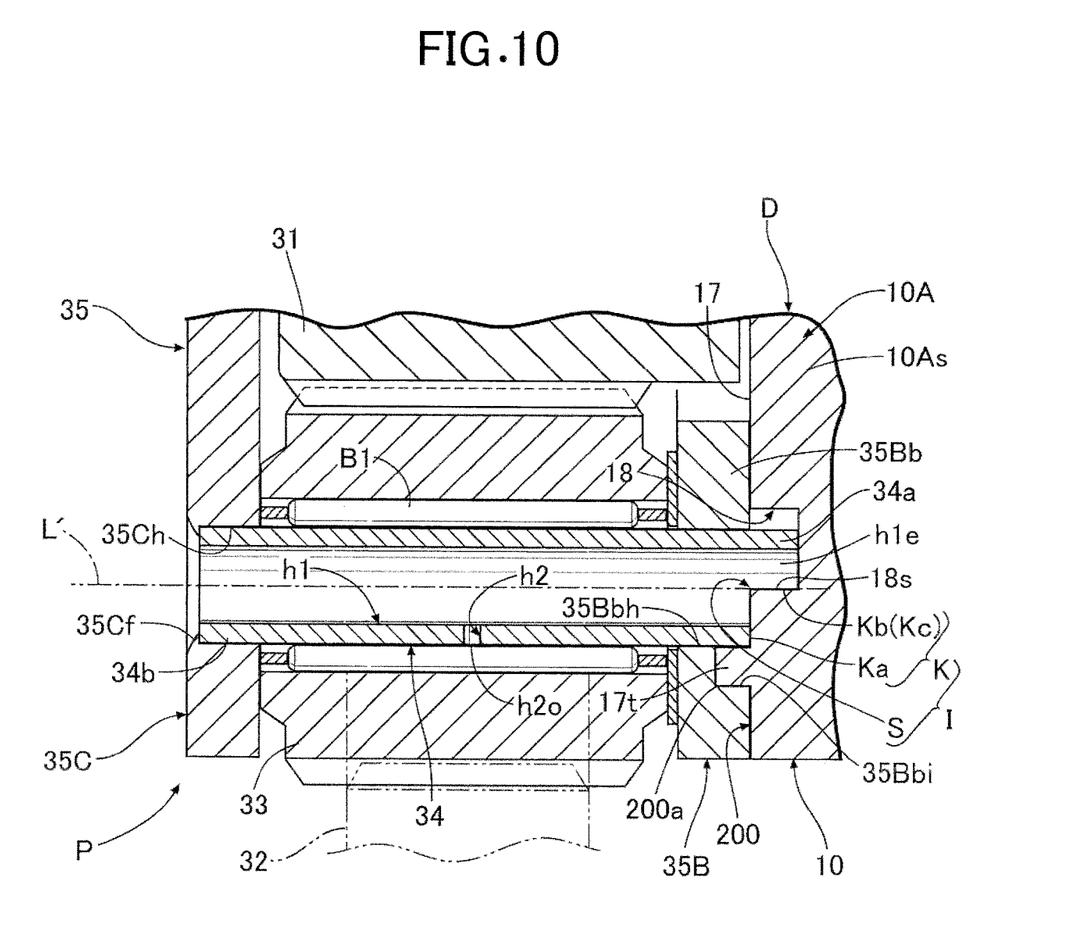
FIG. 10 is an enlarged sectional view of a part shown by arrow A10 in FIG. 8 and an enlarged sectional view (a view corresponding to FIG. 5) along line A10-A10 in FIG. 9. (third embodiment)

A third embodiment of the present invention is now explained by reference to FIG. 8 to FIG. 10.

In the first embodiment, the abutment face 200 (that is, the carrier receiving face 17 and the end face of the carrier main body 35B) between the carrier 35 and the first case half body 10A is made as a flat face without recesses or projections further outside in the radial direction than the positioning groove 18 recessed in the carrier receiving face 17 in order to form the annular step part S (to-be-engaged part) on the first case half body 10A as a transmission member. On the other hand, in the third embodiment, the abutment face 200 has a concavo-convex engagement part concentrically surrounding the positioning groove 18 further outside in the radial direction than the annular positioning groove 18 (to-be-engaged part).

That is, in the third embodiment, an annular projecting portion 17t is formed on the carrier receiving face 17 further outside in the radial direction than the positioning groove 18, whereas an annular recess part 35Bbi into which the projecting portion 17t is fitted is formed in an end face of the carrier main body 35B. Due to the projecting portion 17t and the recess part 35Bbi being concentrically and interlockingly fitted together, the carrier 35 and the first case half body 10A are aligned with each other. In the third embodiment, the inner peripheral face of the projecting portion 17t is in contact with an outer peripheral face of the one end portion 34a of the support shaft 34, but it may be slightly separated from the outer peripheral face.

In accordance with the third embodiment also, in the same manner as in the first and second embodiments, the carrier 35 and the first case half body 10A are abutted against each other on the peripheral side of the engagement part between the cutout face K and the step part S, but the abutment face 200 in the third embodiment in particular is formed as a surface shape having an L-shaped bent portion 200a in a cross section (for example FIG. 10) including the rotational axis L of the carrier 35 on the outside of the support shaft 34 in the radial direction of the carrier 35. Thus, since the abutment face 200 extends as a labyrinth in the above cross section, the amount of lubricating oil that tries to leak (that is, bypass the discharge hole h2) to the outside in the radial direction along the abutment face 200 by centrifugal force from the open end portion h1e of the oil hole h1 of the support shaft 34 can be reduced by the sealing effect of the labyrinth of the abutment face 200. Therefore, the amount of lubricating oil heading from the oil hole h1 toward the discharge hole h2 side can be further increased.

In the first embodiment the outer peripheral part of the abutment face 200 between the carrier 35 and the first case half body 10A is welded by the weld w over the entire periphery, but in the third embodiment the outer peripheral part of the abutment face 200 between the carrier 35 and the first case half body 10A is welded by the weld w only for part of the peripheral direction (that is, a region corresponding to the main body arm portion 35Ba of the carrier 35). This is because in a specific region where the weld w is omitted (that is, a region further outside in the radial direction of the carrier 35 than the support shaft 34), due to the labyrinth sealing effect of the abutment face 200, which is bent in a labyrinth shape, leakage of lubricating oil from the open end portion h1e of the oil hole h1 can be suppressed, and even when the weld w is omitted, no special inconvenience occurs about leakage of lubricating oil.

For assembly of the carrier 35 and the differential case 10 in the third embodiment, a third assembly method that is somewhat similar to the first assembly method described in the first embodiment is employed. In the third assembly method, the carrier 35 and the differential case 10 are permanently joined in a state in which they are aligned due to concentric fitting between the projecting portion 17t and the recess part 35Bbi (that is, without provisionally aligning by means of a jig), and after being permanently joined the planetary gear 33 and the support shaft 34 are positioned and permanently fixed to the carrier 35. Therefore, a jig for provisional alignment or alignment means exclusively used therefor is not required, thus reducing the cost.

In the third assembly method, the carrier 35 and the first case half body 10A are first made to be adjacent to each other in a state in which they are aligned due to the projecting portion 17t and the recess part 35Bbi being concentrically fitted together, and in this state an outer peripheral part of the abutment face 200 between the carrier 35 and the first case half body 10A is welded by a weld w in part of the region in the peripheral direction of the outer peripheral part, thereby concentrically joining the carrier 35 and the first case half body 10A as a unit. Subsequently, the planetary gear 33 is disposed within the carrier 35, the support shaft 34 is inserted through the center hole of the planetary gear 33 via the bearing B1, and the opposite end parts 34a and 34b of the support shaft 34 are fitted into the through holes 35Bbh and 35Ch of the carrier 35. Engaging the cutout face K and the step part S carries out positioning of the support shaft 34 at a specific rotational position, and after the positioning the other end portion 34b of the support shaft 34 is joined to the carrier 35 (more specifically the lid 35C) by swaging. Subsequent assembly of the differential device D is the same as in the first embodiment.

The arrangement of the third embodiment is otherwise basically the same as that of the first embodiment; constituent elements are denoted by the same reference numerals and symbols as those for the corresponding constituent elements of the first embodiment, and further detailed explanation is omitted. In accordance with the third embodiment, in addition to the operational effects specific to the third embodiment, basically the same operational effects as those of the first embodiment can also be achieved.

In the first and second embodiments, the positioning means I for positioning the support shaft 34 at a specific rotational position is also used as means for aligning the carrier 35 with the differential case 10, and in the third embodiment on the abutment face 200 between the carrier 35 and the differential case 10, the annular projecting portion 17*t* and the recess part 35Bbi, which are concentrically fitted together for the purpose of the labyrinth seal effect, are also used as means for aligning the carrier 35 with the differential case 10.

On the other hand, as a fourth embodiment of the present invention, which is not illustrated, alignment of the carrier 35 and the differential case 10 is carried out by alignment means exclusively used therefor, and an outer peripheral part of the abutment face 200 between the carrier 35 and the differential case 10 may be welded over the entire periphery. The exclusively used alignment means may for example be provided on one or the other of the abutment face 200 between the carrier 35 and the differential case 10, and is formed from an annular projecting part and a recess part that are concentrically fitted together further inside in the radial direction of the carrier 35 than the support shaft 34.

This fourth embodiment can achieve basically the same operational effects as those of the third embodiment. In addition, since the alignment means (that is, the annular projecting part and the recess part of the abutment face 200) is positioned further inside in the radial direction of the carrier 35 than the support shaft 34, a labyrinth seal effect due to the alignment means (17*t*, 35Bbi) being further outside in the radial direction than the support shaft 34 as in the third embodiment cannot be anticipated.

Embodiments of the present invention are explained above, but the present invention is not limited to the above embodiments and may be modified in a variety of ways as long as the modifications do not depart from the spirit and scope thereof.

For example, in the embodiments, the differential case 10 of the differential device D allowing a difference in rotational speed between the left and right axles is illustrated as a transmission member, but in the present invention a differential case of a center differential allowing a difference in rotational speed between front and rear wheels may be the transmission member.

In the embodiments described above, the carrier 35 (more specifically the carrier main body 35B) is integrally joined to the differential case 10 (more specifically the first case half body 10A) as the transmission member by means of the weld w, but in the present invention the carrier 35 may be integrally joined to the differential case 10 by various types of joining means other than welding (for example bolting, swaging, adhering, etc.), or the carrier 35 may be formed integrally with at least part of the differential case 10.

In the embodiments above, a flat differential is illustrated in which the differential device D including the differential case 10 as the transmission member is a gear type differential device having a pair of side gears 16 and 16' and a plurality of pinion gears 14 that mesh with the two side gears and can spin and revolve, and the side gears 16 and 16' and the differential case side wall portions 10As and 10Bs are flattened in the axial direction, but in the present invention a differential case of various types of gear type differential devices other than the flat differential (for example a gear type differential device having a spherical split type or integral type differential case) may be the transmission member. Alternatively, a differential case of various types of differential devices other than the gear type differential device (for example various types of differential devices including a planetary gear mechanism and/or a rolling ball type transmission mechanism in which a rolling ball and a cycloidal or trochoidal waveform transmission groove in which the rolling ball rolls are provided between mutually opposing faces of two members) may be the transmission member.

Furthermore, in the embodiments above, as a transmission member joined to the carrier 35, the differential case 10 of the differential device D is illustrated, and power is transmitted from the carrier 35 to the differential case 10 (transmission member) side, but in the present invention an input member or an output member, joined to the carrier, of various types of power transmission devices other than a differential device may be the transmission member. The power transmission device includes, for example, a reduction device with various types of structure (for example one formed from a gear train with a plurality of spur gears, one formed from a planetary gear mechanism, one formed from a rolling ball type transmission mechanism, etc.) and a speed increasing device having the same structure as that of the reduction device.

The invention claimed is:

1. A transmission device comprising a planetary gear mechanism having a plurality of planetary gears that each mesh with a sun gear and a ring gear, a plurality of support shafts that rotatably extend through and support the plurality of planetary gears respectively, and a carrier that supports the plurality of support shafts, a transmission member that is adjacent to the carrier being joined to the carrier so as to rotate integrally therewith, wherein each of the support shafts has an oil hole that extends in an axial direction of the support shaft, a discharge hole that has an inner end communicating with the oil hole and has an outer end opening on an outer peripheral face of the support shaft, and an engagement part that is provided on one end portion of the support shaft, the other end portion of the support shaft is fixed to the carrier, and a to-be-engaged part is provided on the transmission member, the engagement part engaging with the to-be-engaged part so as to be capable of positioning the support shaft at a position in which the outer end of the discharge hole faces outward in a radial direction of the carrier, wherein the oil hole extends through the support shaft in the axial direction thereof, and wherein an open end portion of the oil hole, on the transmission member side, is blocked by mutual engagement between the engagement part and the to-be-engaged part.

2. The transmission device according to claim 1, wherein:

the carrier and the transmission member are formed from separate components and integrally joined to each other, the carrier and the transmission member abut against each other on a periphery of the engagement part and the to-be-engaged part, and an abutment face between the carrier and the transmission member has a bent portion, in a cross section including a rotational axis of the carrier, on the outside of the support shaft in the radial direction.

3. A transmission device comprising a planetary gear mechanism having a plurality of planetary gears that each mesh with a sun gear and a ring gear, a plurality of support shafts that rotatably extend through and support the plurality of planetary gears, respectively, and a carrier that supports the plurality of support shafts, a transmission member that is adjacent to the carrier being joined to the carrier so as to rotate integrally therewith,     wherein each of the support shafts has an oil hole that extends in an axial direction of the support shaft, a discharge hole that has an inner end communicating with the oil hole and has an outer end opening on an outer peripheral face of the support shaft, and an engagement part that is provided on one end portion of the support shaft, the other end portion of the support shaft is fixed to the carrier, and a to-be-engaged part is provided on the transmission member, the engagement part engaging with the to-be-engaged part so as to be capable of positioning the support shaft at a position in which the outer end of the discharge hole faces outward in a radial direction of the carrier, wherein the to-be-engaged part is formed from an annular step part that is provided on a face, opposing the carrier, of the transmission member and is coaxial with the transmission member,     and wherein the engagement part has a shape such that the carrier can be positioned coaxially with the transmission member via the support shaft due to engagement between the engagement part and the step part.

4. The transmission device according to claim 3, wherein the oil hole extends through the support shaft in the axial direction, and     an open end portion, on the transmission member side, of the oil hole is blocked by mutual engagement between the engagement part and the to-be-engaged part.

5. The transmission device according to claim 2, wherein the carrier and the transmission member are formed from separate components and integrally joined to each other,     the carrier and the transmission member abut against each other on a periphery of the engagement part and the to-be-engaged part, and     an abutment face between the carrier and the transmission member has a bent portion, in a cross section including a rotational axis of the carrier, on the outside, in the radial direction, of the support shaft.

* * * * *